United States Patent [19]

Frazita

[11] 4,104,636
[45] Aug. 1, 1978

[54] DOPPLER REFERENCE ANTENNA WITH PHASED CENTERLINE EMPHASIS

[75] Inventor: Richard F. Frazita, Deer Park, N.Y.

[73] Assignee: Hazeltine Corporation, Greenlawn, N.Y.

[21] Appl. No.: 729,064

[22] Filed: Oct. 4, 1976

[51] Int. Cl.² .................................................. G01S 1/40
[52] U.S. Cl. .............................. 343/106 D; 343/108 M
[58] Field of Search ........ 343/108 M, 106 D, 113 DE, 343/854

[56] References Cited

U.S. PATENT DOCUMENTS

| | | | |
|---|---|---|---|
| 3,208,067 | 9/1965 | Alford | 343/853 X |
| 3,308,468 | 3/1967 | Hannan | 343/853 X |
| 3,864,679 | 2/1975 | Hannan et al. | 343/106 D X |
| 3,864,680 | 2/1975 | Hannan | 343/108 M X |

*Primary Examiner*—Maynard R. Wilbur
*Assistant Examiner*—Richard E. Berger

[57] ABSTRACT

In a doppler radionavigation system wherein a transmitted signal has opposite frequency coding during alternating time intervals, a reference antenna is provided which has different radiation modes during the alternating time intervals. In a preferred embodiment, the two reference antenna modes have substantially the same amplitude radiation pattern, but different phase radiation characteristics. The phase between the radiation in a selected direction and the radiation in the remaining directions is different for the two antenna modes. This phase change substantially reduces the position determination error resulting from multipath signals.

14 Claims, 20 Drawing Figures

$(a_1 - \beta_1) - (a_2 - \beta_2) = \pi$
$(a_1 - \gamma_1) - (a_2 - \gamma_2) = \pi$

DOPPLER REFERENCE ANTENNA WITH PHASED CENTERLINE EMPHASIS

BACKGROUND OF THE INVENTION

This invention relates to doppler radionavigation systems, and in particular to the reference antenna used in such systems.

Doppler navigation systems are characterized in the use of transmitters coupled with antennas which produce a radiation pattern in space wherein the frequency of radiation varies with a selected angular coordinate. Transmitting antenna systems of this type have been described in U.S. Pat. Nos. 3,864,679; 3,864,680; and 3,845,486.

FIG. 1 is an illustration of a doppler radio-navigation system in accordance with the prior art of the type to which this invention is pertinent. In the system of FIG. 1 there is provided a linear array 20 of antenna elements 22a through 22m. A commutator 24 is associated with array 20 and is designed to sequentially supply signals provided at commutator input 26 to the antenna elements 22. As a consequence of the operation of commutator 24, when radio frequency signals are supplied to input 26 and commutator 24 is activated to sequentially connect input 26 to antenna elements 22a, 22b, etc., there appears to be a moving source of radiation along the antenna aperture formed by linear array 20. In the system illustrated in FIG. 1, commutator 24 is designed to alternately provide signals in a first sequence starting with element 22a and ending with element 22m, or in a second sequence, starting with element 22m and ending with element 22a. It should be recognized that antenna elements 22 may comprise columns of elements in a direction orthogonal to the array to provide radiation pattern shaping. Alternatively other frequency coding antennas such as those described in U.S. Pat. Nos. 3,864,679 and 3,864,680 may be used in lieu of the commutated array 20.

Those familiar with this type of system will recognize that the sequential radiation from elements 22 appears to an observer in the radiation field of the antenna to be a source of radiation which is moving along the aperture of array 20. When commutator 24 is operated in its first sequence the motion appears to be in the direction of the arrow indicated in FIG. 1 at a velocity V corresponding to the switching rate of commutator 24. When commutator 24 is operated in its second sequence the motion of the source is reversed.

According to well-known principals the moving source of radiation causes there to be an apparent frequency shift in the radiated pattern, which depends on the angular position of the observer with respect to linear array 20. The amount of frequency shift is proportional to the sign of the angle $\theta$ from the broadside axis 25 of array 20. In addition, the frequency variation of radiation with angle $\theta$ is reversed, when the apparent motion of the source of radiation is reversed, upon activation of the second sequence of commutator 24.

Array 20 may be used to provide angular position information in an aircraft microwave landing system. In such a system an aircraft receiving the radiation from array 20 may make a frequency measurement of the radiation and therefore determine its angular position with respect to array 20 and consequently with respect to a runway. By using two orthogonally positioned arrays, each similar to array 20, an aircraft may receive coded information to determine both azimuth and elevation position information with respect to a runway. An additional antenna equipped with a transponder may be used to determine range information, thereby providing a pilot with a complete set of positioning information.

In a microwave landing system the receiver which is to make a frequency measurement of the radiation from array 20 is located on the aircraft, which is naturally moving at a significant velocity with respect to array 20. The motion of the aircraft itself causes a frequency shift $\delta F$ which cannot easily be distinguished from the angular frequency variation $F_D$ of the radiated signal from antenna 20. In order to enable a measurement of aircraft angular position independent of aircraft velocity, a second antenna 28 is provided to radiate a reference signal which when detected by an aircraft has the same frequency shift as a result of aircraft motion, since the aircraft's relative velocity with respect to the two antennas is substantially the same. In order to prevent radiation interference between the signals radiated by antennas 20 and 28, each antenna radiates a slightly different radio frequency.

Reference antenna 28 is shown in FIG. 1 to be an array of antenna elements 30 which may be similar to elements 22 of array 20. A power divider is provided to supply wave energy from an input port to the various elements 30 in an amplitude and phase to cause antenna 28 to radiate a signal into the desired angular region of system operation. Elements 30 are therefore supplied with wave energy having amplitude and phase characteristics which result in the desired radiation pattern, including possibly sidelobe suppression or pattern emphasis in a selected direction along a runway center line.

The system shown in FIG. 1 includes an oscillator 32 which continuously operates at a carrier frequency $F_C$. The output of oscillator 32 is provided to the input power divider of reference antenna 28 and also to mixer 34. An additional oscillator 36 operates continuously at an offset frequency $F_O$, which is selected to be substantially less than carrier frequency $F_C$. The output of mixer 34 comprises wave energy signals at frequencies above and below the carrier frequency by the offset frequency of oscillator 36. After appropriate filtering by filters 38 and 40 the signals are supplied alternately to commutator 24 by switches 42 and 44. When commutator 24 is operating in its first sequence during a first time interval, switch 42 is closed and the commutator is supplied with wave energy signals at a frequency higher than the carrier frequency. When commutator 24 is operating in its second sequence during a second time interval, switch 44 is closed and signals are supplied to commutator 24 at a frequency which is below the carrier frequency by the offset frequency.

In sequential dual scan operation commutator 24 is operated in its first and second sequences during alternating time intervals, and the signal provided to commutator 24 is alternated between a signal above and below the frequency of the signal supplied to reference antenna 28. This may be achieved by the apparatus of FIG. 1, whereby the signals supplied to commutator 24 are alternated between signals at frequencies above and below a fixed carrier during time intervals of duration T, as shown in FIG. 14A, or may be achieved by alternately switching signal sources between commutator 24 and reference antenna 28, as shown in FIG. 14B. In both FIGURES the reference antenna signal frequency is shown as a solid line and the commutator signal frequency is shown as a dotted line for any time interval. A transmission may cntain typically 12 such time intervals and angle measurements are made using an average value of the received signal frequency over the transmission. This averaging process is called "multiscan averaging".

FIG. 3 illustrates the center frequency relation of the signals used in the FIG. 1 system. It will be recognized by those skilled in the art that the actual radiated signals will have a bandwidth, which is significantly wider than the narrow spectrum line illustrated. The bandwidth is the result of the finite time duration of the transmitted signal. For simplicity only the center frequency of the spectrum of each signal is illustrated. Reference antenna 28 radiates the carrier frequency $F_C$. Array antenna 20 radiates during a first time interval a signal which has a frequency $F_C + F_O$. Because of the frequency-space coding characteristics of array 20 an observer in space measures this frequency only if he is located on the broadside axis of array 20. This is indicated at $\theta = 0$ in FIG. 3. When an observer is at an angle $\theta_D$, he observes the radiation from array 20 at a frequency which is greater than $F_C + F_O$ by an amount $F_D$ corresponding to the space frequency coding of array 20. This is indicated by $F_C + F_O + F_D$ in FIG. 3. This frequency of radiation is offset from the reference antenna radiation by an amount $F_O + F_D$ which is called the angletone frequency and can be obtained in the receiver by detecting the beat frequency of the reference radiation and the array radiation.

When commutator 24 of array 20 is operated in its second sequential mode, during alternate time intervals, the signals supplied to the input of commutator 24 are at a frequency $F_C - F_O$. Because of the reverse sequence of radiation from antenna elements 22, the angular frequency coding of the radiation from array 20 is opposite the frequency coding during the first time interval and therefore the Doppler shift observed by a receiver at an angle $\theta_D$ is also opposite. On the left side of the spectrum diagram in FIG. 3 there are shown the received array signals observed at angle $\theta = 0$ and also at another angle $\theta_D$ corresponding to the signal illustrated for the first sequence to the right of FIG. 3. It will be observed that the offset from the reference carrier frequency has the same magnitude, but opposite sense.

In practical operation of a microwave landing system antenna 20 radiates a series of transmissions. These transmissions are in alternating sequences of commutator 24 and at alternate frequencies above and below reference frequency $F_C$. The aircraft receiver 21 includes an RF stage 23 and detector 25 which detects the mixed signal of the reference carrier and the array signal, both including a component $\delta F$ arising out of aircraft motion. The detector output is the difference or angletone frequency which corresponds to the offset frequency of oscillator 36 plus the doppler shift frequency, which can be decoded into angular information in frequency measurement circuit 27. If there are a repeated number of transmissions, alternating ones having opposite frequency offset and angular coding, the circuit 27 can perform an averaging function to increase angular measurement accuracy. In a typical system the repetition of transmissions may be at a rate of 400 transmissions per second.

It is known that a problem in Doppler navigation systems of the type described above could arise on account of multipath reflections from objects near a runway, such as aircraft hangars. FIG. 2 illustrates the conditions under which such a problem can arise. Array antenna 20 and reference antenna 28 are illustrated at the end of runway 60. As an aircraft 62 approaches the opposite end of runway 60 the signals radiated by antennas 20 and 28 may reach aircraft 62 by direct signal paths 66 and 68 and also by reflected signal paths 70 and 72, which are reflected from the wall of hangar 64. Under these conditions the motion of aircraft 62 with respect to antennas 20 and 28 is different than the motion of aircraft 62 with respect to hangar 64. The radiation reflected off hangar 64 is therefor received at aircraft 62 with a different Doppler shift frequency than the radiation coming directly from antennas 20 and 28. In addition, the radiation along path 70 from array antenna 20 to aircraft 62 originates at a different angle than the radiation along direct path 66. As a result this radiation has a different radiation frequency by reason of the angular variation in radiated frequency characteristic of antenna 20. FIGS. 4A and 4B illustrate the effect of the presence of the indirect or multipath radiation at the receiver in aircraft 62.

FIG. 4A illustrates the received center frequency of the signals which result from direct and multipath coded and reference signals during the first commutator sequence of antenna 20. The FIGURE illustrates the detected angletone frequency. The signals which are received directly from coding antenna 20 and reference antenna 28 produce a detected signal with an angletone frequency at $F_O + F_D$. For reference purposes this signal $C_D R_D$ is illustrated with unity amplitude. The angletone signal $C_D R_M$ which is derived from the direct coded signal $C_D$ and the multipath reference signal $R_M$ is illustrated to have a magnitude $\rho$, which is the amplitude of the reflection coefficient of the multipath reference signal. This signal $C_D R_M$ is shifted in frequency from the direct signal $C_D R_D$ by amount $d$ which corresponds to the "scalloping frequency" or Doppler shift difference on account of the differential motion of aircraft 62 with respect to reference antenna 28 and hangar 64.

Two additional angletone signals have center frequencies which are additionally offset from the desired angletone frequency $C_D R_D$ because of the frequency coding characteristics of antenna 20. These additional signals result from the mixing of the multipath coded signal $C_M$ with the direct reference signal $R_D$ to produce an angletone signal $C_M R_D$ having an amplitude $\rho$, and from the mixing of the multipath coded signal $C_M$ with the multipath reference signal $R_M$ to produce an angletone signal $C_M R_M$ with an amplitude $\rho^2$. These signals are offset from the direct signal angletone $C_D R_D$ by an amount $K\theta_{sep}$, where $\theta_{sep}$ is the angular separation of aircraft 62 and hangar 64 when viewed from antenna 20. This angle is illustrated in FIG. 2; K is the angular frequency coding coefficient of antenna 20.

In a typical Doppler processing system the signals which result from the multipath coded signal $C_M$ do not produce a significant error in measurement of the desired angletone signal $C_D R_D$ because the additional frequency offset $K\theta_{sep}$ resulting from the angular frequency variation of radiation from antenna 20 generally places these signals outside of the passband of the tracking filter used in the angletone signal processor. The passband of this filter is illustrated with dotted lines in FIGS. 4A and 4B.

FIG. 4B illustrates the central frequencies of the received angletone signals during the second commutator sequence of antenna 20. During this sequence the reference signal frequency is above the coded signal frequency and therefore the relative position of the multipath error signals with respect to the desired angletone signals have been interchanged. As in the spectrum illustrated in FIG. 4A, only the error signal resulting from the mixing of the direct coded signal with the multipath reference signal falls within the passband of the processor filter.

The presence of the additional signal within the filter passband may, under some circumstances, cause a significant error in the measurement of the angletone signal as pointed out by the Evans et al. report. In particular, when the scalloping frequency, resulting from the differential Doppler shift on account of different relative motion of aircraft 62 with respect to antenna 20 and hangar 64, has a frequency which is one half the frequency of sequential transmissions of coding antenna 20, there occurs a significant build up of multipath errors. The error signal resulting from mixing of the direct coded antenna signal $C_D$ and the multipath reference signal $R_M$ has a natural 180° phase change between sequences of antenna 20, since the coded signal frequency on each sequential transmission is shifted to be opposite with respect to the reference frequency. When the scallop frequency of the multipath reference signal is equal to one half the transmission repetition frequency there exists a condition wherein there is an additional 180° phase shift of the error signal between adjacent transmissions from antenna 20. When this condition occurs, as was suggested in the article by Evans, the angletone multipath error, resulting from the multipath reference signal, has the same phase during each of sequential transmissions of antenna 20. As a result, an attempt to remove the error by multiscan averaging of the detected angletone frequency during a number of such transmissions fails and the resulting signal includes an accumulation of the error resulting from the multipath reference signal. Another way of describing the accumulation of angle error is as follows: The multipath reference signal causes a phase modulation of the reference signal. When the motion frequency produces a 180° differential phase shift between the reflected and direct reference signals over the time interval of one scan (sequence), the resulting Doppler frequency measurement error repeats on all scans and there is no reduction in the error by multiscan averaging.

It is therefore an object of the present invention to provide a Doppler radionavigation system having reduced susceptibility to errors resulting from multipath signals.

It is a further object of the invention to provide such a system wherein errors resulting from the multipath signal may be removed by averaging over a number of sequential transmissions.

The present invention is used in a Doppler navigation system, which uses a reference antenna to radiate a reference frequency signal and a coding antenna to radiate a frequency coded signal, both into a region of space during first and second time intervals. In such a radionavigation system the coded signal has a first frequency offset from the reference signal and a first angular frequency variation during the first time interval, and has opposite frequency offset and opposite angular frequency variation during the second time interval. A mobile receiver makes a determination of its angular location by comparing the frequency of the reference signal and the coded signal during the first and second time intervals. In accordance with the invention the reference antenna has a first radiation mode during the first time interval and a second radiation mode during the second time interval. The phase of radiation at a selected angle with respect to the phase of the radiation in remaining angles in the region of space is different for the first and second modes.

A reference antenna in accordance with the invention may be provided by combining an antenna aperture and illumination means having first and second input terminals. The illumination means is arranged so that signals supplied to the first input terminal cause the aperture to radiate primarily at the selected radiation angle and signals supplied to the second input terminal cause the antenna to radiate in the remaining directions within the region of space, with substantially no radiation at the selected radiation angle. A power divider is provided for coupling supplied wave energy signals to the first and second input terminals with a first phase relation to cause the antenna to radiate the first mode and a second phase relation to cause the antenna to radiate the second mode.

The phase between signals at the selected radiation angle and the remaining radiation angles in the region of space preferably varies by 180° between the first and second modes. To achieve this, the phase relation between the signals supplied to the first and second input terminals is also varied by 180° between the first and second radiation modes. In a preferred embodiment signals at the selected radiation angle have quadrature phase with respect to signals at the remaining radiation angles for both the first and second radiation modes. The illumination means is preferably arranged to provide orthogonal aperture illuminations comprising symmetrical and asymmetrical aperture exitation amplitude distributions. Conventional coupling or beam-forming networks may be used as the illumination means when the aperture comprises an array of antenna elements. Feedhorns may be used when the aperture comprises a focusing reflector.

For a better understanding of the present invention together with other and further objects thereof, reference is made to the following description, taken in conjunction with the accompanying drawings, and its scope will be pointed out in the appended claims.

DESCRIPTION OF THE PREFERRED EMBODIMENT

Figure 1:
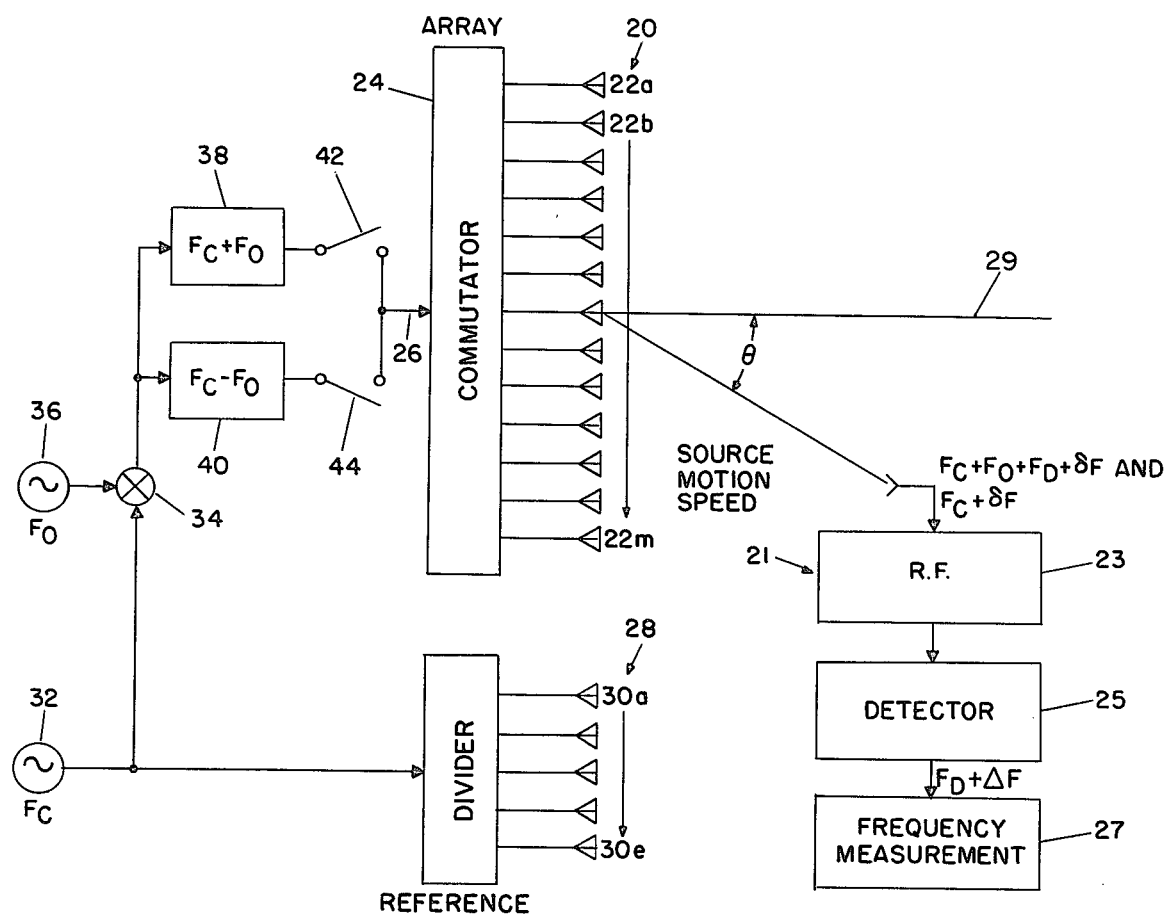
FIG. 1 is a schematic diagram showing a Doppler radionavigation system in accordance with the prior art.

As pointed out with reference to the prior art system of FIG. 1, an accumulation of error signals arising out of multipath reference antenna radiation can occur when the Doppler motion frequency of the multipath radiation is different than the Doppler motion frequency of direct reference antenna radiation by an amount which is one-half the repetition frequency of the coding antenna transmissions. The half-frequency relation arises because of a natural 180° phase shift between transmissions, which arises out of the reversal of the coded and reference signal frequencies. The present invention is based on the realization that, by reversing the phase of the reference antenna radiation in the direction of the multipath radiation signal, the natural phase reversal of the error signal during alternate time intervals can be eliminated. In other words, the phase modulation of the reference signal is reversed during successive time intervals. This causes a reversal of the Doppler frequency measurement error during each successive time interval and the error is thereby reduced by averaging. As a consequence, a build up of the error signal will be avoided as long as the differential Doppler frequency, or "scalloping frequency" is less than the transmission repetition frequency. In achieveing this phase reversal, it is undesirable to reverse the phase of the direct reference antenna signal, since this would result in a phase reversal of all signals in the system including the desired signal and would not achieve the desired effect since the error signal would have the same phase relation to the desired signal.

Figure 2:
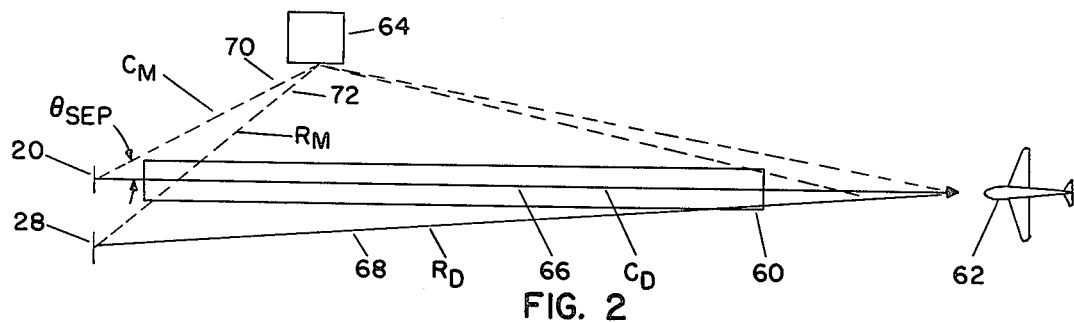
FIG. 2 illustrates an aircraft approaching a runway equipped with the system of FIG. 1, and having a nearby object causing a multipath interference signal.
Figure 14A:
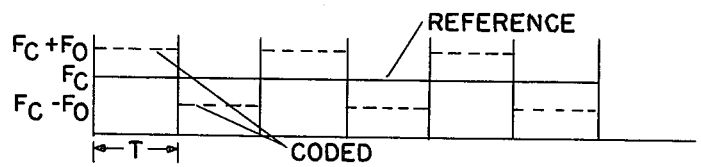
FIGS. 14A and 14B illustrate the frequencies of signals supplied to antennas 20 and 28 during a number of time intervals suquential dual scan operation in the radionavigation system of FIG. 1.
Figure 14B:
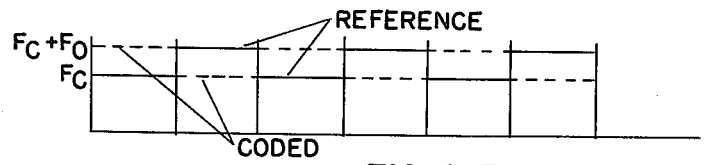
Figure 3:
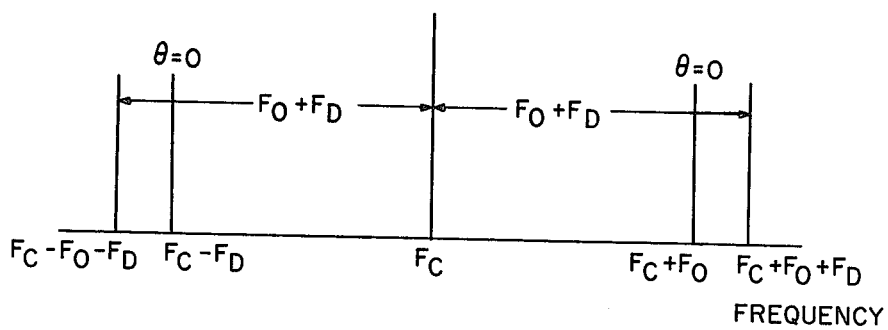
FIG. 3 is a spectral diagram of the signals radiated by the FIG. 1 system.
Figure 4A:
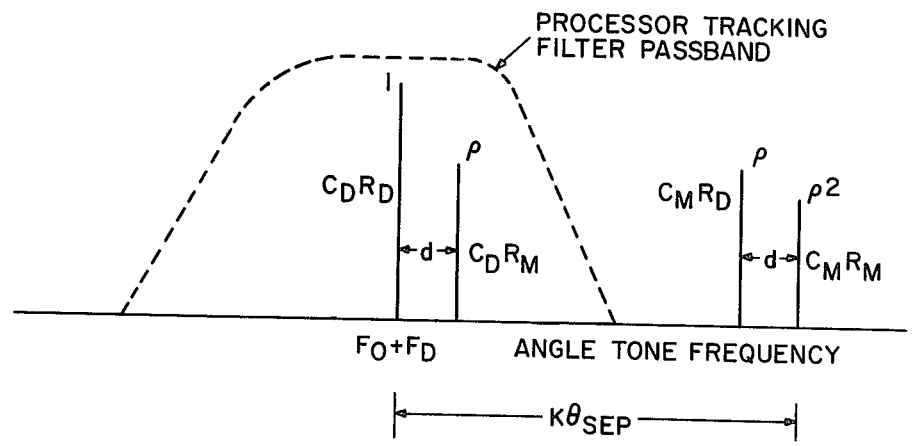
FIGS. 4A and 4B are spectral diagrams of the detected signal in the radionavigation system of FIG. 1, including multipath signals.
Figure 4B:
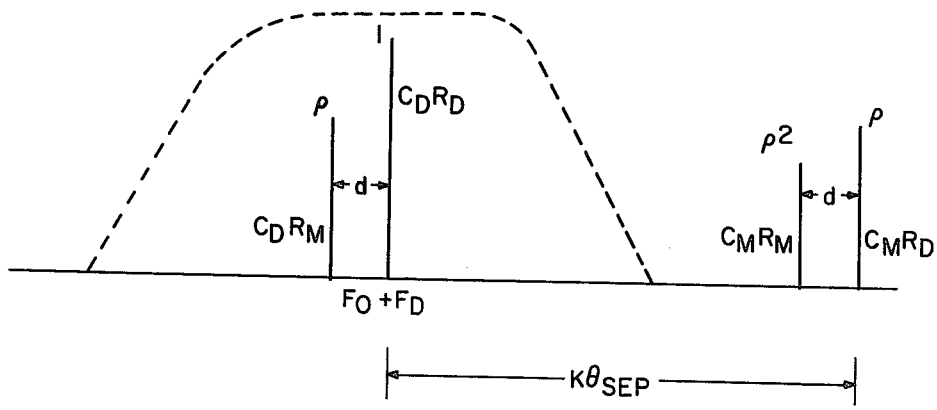
Figure 5A:
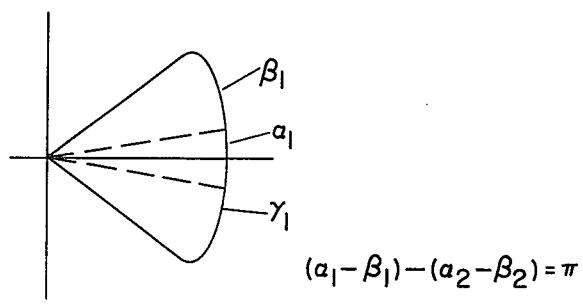
FIGS. 5A and 5B illustrate the radiation modes of a reference antenna in accordance with the present invention.
Figure 5B:
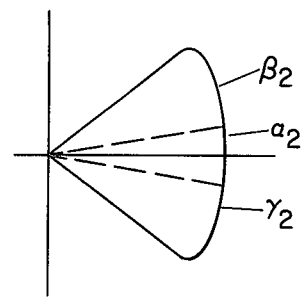

FIGS. 5A and 5B illustrate the radiation modes of a reference antenna which will accomplish the objective of removing the natural phase reversal of the multipath error signal. Assuming the situation illustrated in FIG. 2, wherein aircraft 62 on final approach is situated at a direction which is broadside to reference antenna 28, and a multipath signal is received by aircraft 62 from a reflecting object 64 adjacent the runway, it is desirable to reverse the phase during alternate time intervals in the portion of radiation from reference antenna 28 which is in the direction 72 of the reflecting object 64, without reversing the phase of the radiation from reference antenna 28 in the broadside direction, corresponding to the direct signal path 66 to aircraft 62. This objective can be achieved by using a reference antenna with two modes and using alternate modes during the alternate transmission time intervals.

FIG. 5A illustrates the desired phase of the radiation mode for the reference antenna during a first time interval. The radiation in the region near the broadside direction of the antenna, $\alpha_1$ has a first phase. The radiation in the remaining regions of the antenna pattern has phase, $\beta_1$ and $\gamma_1$ with respect to the radiation in the broadside direction. Since the radiation pattern is continuous, there are naturally directions, indicated by dotted lines, wherein the phase varies with angular direction from $\alpha_1$ to $\beta_1$ and from $\alpha_1$ to $\gamma_1$ respectively.

FIG. 5B illustrates the phase relation of the second radiation mode used during a second or alternate time interval. The phase of radiation in the various directions of radiation is indicated to be $\alpha_2$ $\beta_2$ and $\gamma_2$. In accordance with the present invention the phase $\beta_2$, with respect to $\alpha_2$ is different than the phase $\beta_1$ with respect to $\alpha_1$, and phase $\gamma_2$ with respect to $\alpha_2$ is different than phase $\gamma_2$ with respect to $\alpha_1$. The phase change is preferably 180° to effect removal of the multipath error signal phase reversal during the alternate time intervals. The equations which define this full reversal of phase are set forth in FIG. 5.

Figure 6A:
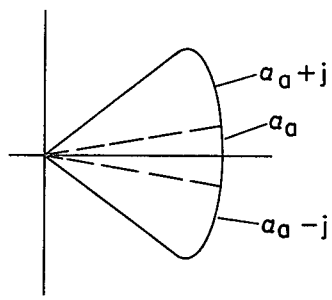
FIGS. 6A and 6B illustrate quadrature reference antenna radiation modes in accordance with the present invention.
Figure 6B:
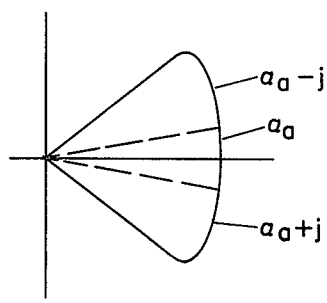

FIGS. 6A and 6B illustrate the phase of radiation during alternate time intervals in accordance with a preferred embodiment of the invention. Since the phase of signals radiated at directions away from the broadside direction with respect to the signals radiated in the broadside directions is preferably reversed on alternate scans, it is preferred that these signals have a quadrature phase relation. The quadrature phase relation pevents amplitude changes in the radiation pattern on the two modes radiated during alternate time intervals.

Figure 7:
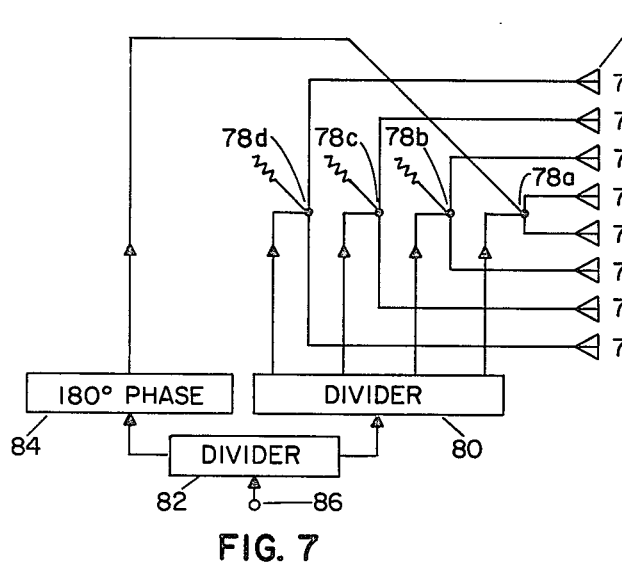
FIG. 7 is a schematic diagram of the reference antenna in accordance with the present invention.
Figure 7A:
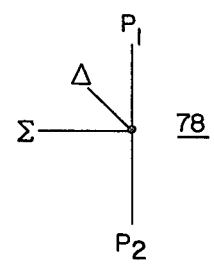
FIG. 7A illustrates the conventions used for the parts of the hybrids shown in FIG. 7.
Figure 8:
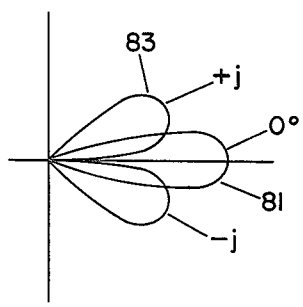
FIG. 8 illustrates the component radiation patterns of the FIG. 7 reference antenna.

FIG. 7 is a schematic diagram of a reference antenna in accordance with the invention for producing the radiation modes illustrated in FIGS. 5 and 6. The FIG. 7 antenna includes an aperture comprising a linear array 74 of elements 76a through 76h. Corresponding elements 76 on alternate sides of the array center are connected to hybrid junctions 78a through 78d. FIG. 7A illustrates the conventions used for the ports of the hybrids shown in FIG. 7. $P_1$ and $P_2$ are the colinear ports of the hybrid junction. Σ designates the sum port, which is coupled in phase to the colinear ports $P_1$ and $P_2$. Δ designates the hybrid difference port, which is coupled in opposite phase to colinear ports $P_1$ and $P_2$. The sum ports of hybrid junctions 78 are connected to the outputs of power divider 80. Wave energy signals supplied to power divider 80 are supplied in substantially constant phase to all of elements 76, with uniform or symmetrical tapered amplitude, to produce a narrow radiation pattern 81 shown in FIG. 8. The difference port of hybrid 78 a is coupled to power divider 82 by phase shifter 84, which provides either 0° or 180° of phase shift. Wave energy signals coupled to hybrid 78a by phase shifter 84 provide an assymetrical illumination on the aperture of array 74, consisting of positive and negative equal amplitude exitation of elements 76d and 76e. The resulting radiation pattern 83 illustrated in FIG. 8 is an assymetrical pattern with quadrature phase relation to narrow beam pattern 81 and is characteristic of the difference radiation pattern used in monopulse tracking antennas. Hybrids 78 and power divider 80 form an illumination means for the antenna aperture comprising array 74. Two terminals are provided, one being the difference port of hybrid 78a, and the other being the input port of power divider 80. These terminals correspond to component radiation patterns 83 and 81, respectively.

Figure 9:
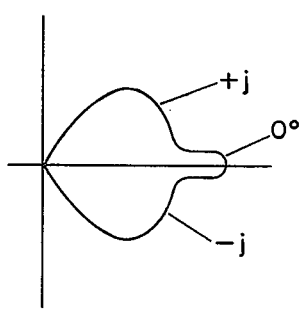
FIG. 9 illustrates the composite radiation pattern of the FIG. 7 antenna.

Wave energy signals supplied to input port 86 of power divider 82 are supplied to elements 76 with two illuminations as described above. In alternate time intervals phase shifter 84 is switched 180°, reversing the phase of the assymetrical radiation pattern 83. The power dividing ratio of divider 82 is selected in accordance with the desired amplitude radiation pattern. A preferred pattern is illustrated in FIG. 9, wherein the radiation amplitude is greater in the region surrounding antenna broadside, which corresponds to a runway direction. There is a smaller amplitude of radiation in the remaining angular directions, thereby reducing the ratio of multipath signal amplitude to direct signal amplitude in an aircraft receiver. A center line emphasis radiation pattern as illustrated in FIG. 9 may be easily achieved with the antenna of FIG. 7 by using an equal amplitude power divider 82. The higher gain of array 74 in pattern 81, by reason of illumination of all of elements 76 by power divider 82, provides a natural enhancement of the amplitude of the radiated signal in the broadside direction. By varying the relative power supplied by power divider 82 to phase shifter 84 and power divider 80, it is possible to similarly vary the amplitude pattern characteristic of the composite radiation pattern of FIG. 9.

If the radiation pattern of FIG. 9 is taken to have zero phase in the radiation direction corresponding to broadside, the radiation in the regions substantially away from broadside will have phase of plus or minus 90°, in quadrature with the broadside radiation. The phase of the radiation in regions near the antenna broadside will vary between 0 and ±90° according to the relative amplitude of pattern 81 and pattern 83, from which the composite pattern illustrated in FIG. 9 is derived. During alternate time intervals, when the phase of phase shifter 84 is changed by 180°, the phase of the radiation in the broadside direction remains unchanged while the phase of the radiated signal in directions away from broadside, from which multipath radiation may originate, is changed from 90° to −90° or vice versa.

ALTERNATE EMBODIMENTS OF THE INVENTION

Figure 10:
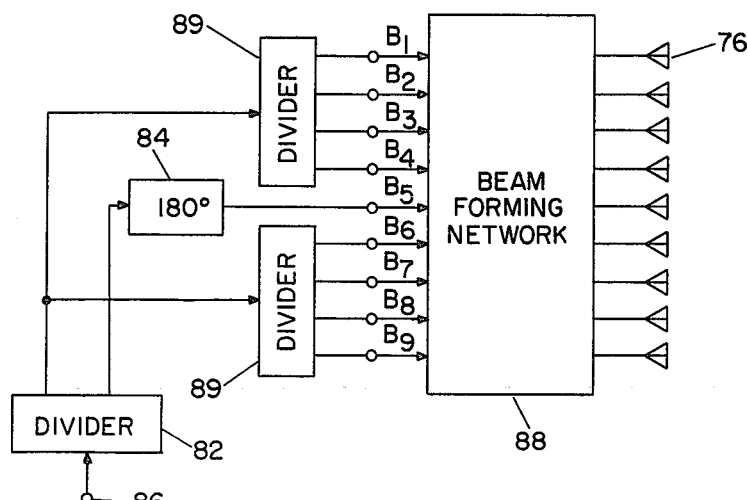
FIG. 10 is a schematic diagram of an alternate reference antenna in accordance with the present invention.
Figure 11:
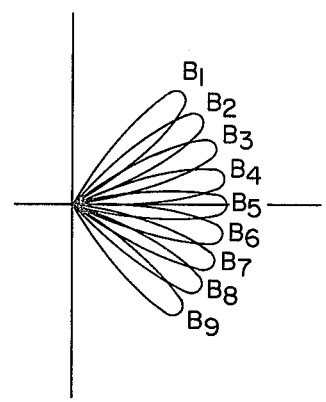
FIG. 11 illustrates the component radiation patterns of the FIG. 10 antenna.

FIG. 10 illustrates an alternate embodiment of the antenna of the present invention, which makes use of a beam forming network 88 and an array of elements 76. The network 88 may be a Butler Matrix of other similar coupling circuit having a plurality of input ports $B_1$ through $B_9$ for coupling wave energy signals from the input ports to elements 76 to result in corresponding radiation patterns $B_1$ through $B_9$ illustrated in FIG. 11. Using the power dividers 82 and 89 and phase shifter 84 illustrated in FIG. 10, it is possible to achieve the radiation patterns characteristic of the present invention by shifting the phase supplied to network port $B_5$, corresponding to the broadside or selected direction, with respect to the signals supplied to the other ports of the network. In this embodiment signals with the same phase may be radiated in directions on either side of the selected direction.

Figure 12:
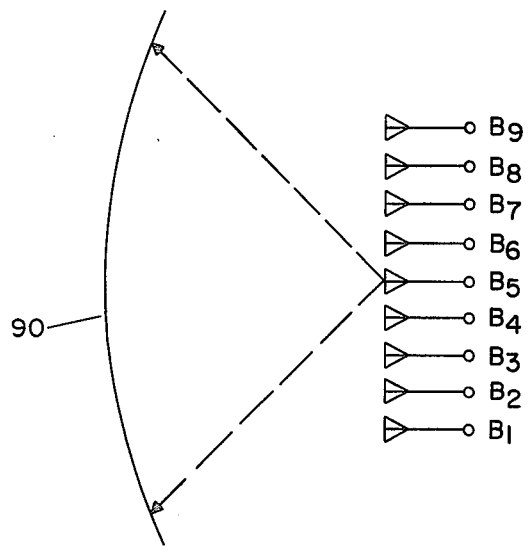
FIG. 12 is a schematic diagram of an alternate reference antenna in accordance with the present invention.

A similar result is obtained using the antenna illustrated in FIG. 12, which may be constructed in accordance with U. S. Pat. No. 3,881,178 to Hannan which assigned to the same assignee as the present invention. In accordance with the Hannan patent there is provided a plurality of illiminating antenna feed elements $B_1$ through $B_9$, which radiate signals onto an aperture comprising reflector 90, causing reflector 90 to radiate a plurality of radiation patterns similar to those illustrated in FIG. 11. Circuits similar to those shown in FIG. 10 may be used to supply wave energy signals to elements $B_1$ through $B_9$ illustrated in FIG. 12. Each of the elements of the antenna in FIG. 12 corresponds to one of the ports of beam forming network 88 of FIG. 10.

Figure 13:
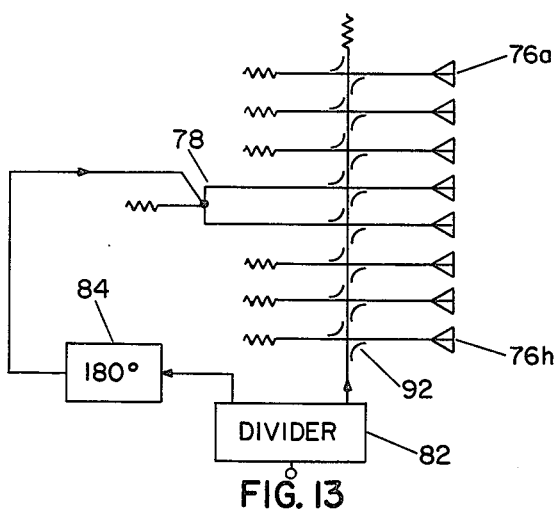
FIG. 13 is a schematic diagram of an alternate reference antenna in accordance with the present invention which uses a series feed.
Figure 13A:
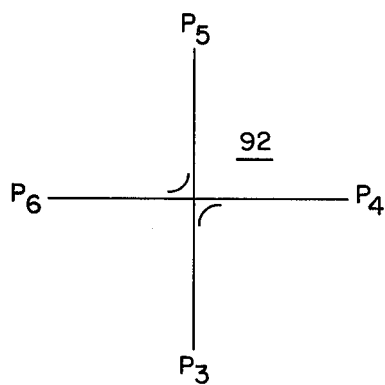
FIG. 13A illustrates the characteristics of the couplers used in FIG. 13.

FIG. 13 illustrates still another embodiment of the antenna of the present invention. The antenna of FIG. 13 is similar to the antenna of FIG. 7, except that a series feed comprising a number of directional couplers 92 is used to supply the in-phase illumination to antenna elements 76a through 76h. The characteristics of couplers 92 used in the antenna of FIG. 13 are illustrated in FIG. 13A. Signals supplied to port $P_3$ of coupler 92 are supplied with 90° phase and amplitude reduced by the couple factor, to port $P_4$ and with the remaining power to port $P_5$. Port $P_6$ is isolated from port $P_3$, but coupled to ports $P_4$ and $P_5$. Those skilled in the art will recognize that a dual line series coupling network may also be used in the antenna of FIG. 13, having two series of couplers 92, one to provide the symmetrical illumination to elements 76 and the other to supply the asymmetrical illumination to elements 76. Use of dual coupling networks results in greater radiation pattern control for each illumination.

It will be evident to those skilled in the art that the benefits of the present invention may be equally realized when the phase of the signal supplied in an illumination to cause the aperture radiated in the selected or broadside direction, may be reversed rather than reversing the phase of the signal which illuminates the aperture to radiate in the remaining regions. Thus, for example, radiation pattern 81 of FIG. 8 may be provided with phase of zero or 180° during alternate time intervals while the phase of radiation pattern 83 remains constant plus and minus 90°.

An alternate arrangement to FIG. 10 could locate the 180° phase shifter at the input to either of the dividers 89 to achieve a similar benefit as cited previously and in addition to provide benefits to aircraft outside the region of the runway centerline.

In describing the various embodiments above, reference has been made to transmitting antenna systems, but it will be recognized by those skilled in the art that the principles of the present invention can also be applied to systems using a mobile transmitter and a stationary direction finding receiver. Accordingly, the appended claims should be construed as covering both transmitting and receiving antenna systems regardless of the descriptive terms actually used therein.

While there have been described what are believed to be the preferred embodiments of the invention those skilled in the art will recognize that other and further modifications may be made thereto without departing from the spirit of the invention, and it is intended to claim all such embodiments as fall within the true scope of the invention.

I claim:

1. An antenna for radiating wave energy signals into an angular region of space in a first radiation mode, wherein signals at a selected radiation angle have a first phase with respect to signals at radiation angles away from said selected angle, and in a second radiation mode, wherein said signals at said selected radiation angle have a second phase with respect to signals at radiation angles away from said selected angle, comprising: aperture means for radiating wave energy signals which are coupled thereto; illumination means, having first and second inputs, for coupling wave energy signals supplied to said first input to said aperture means with an amplitude and phase excitation to cause said aperture means to radiate primarily at said selected radiation angle and for coupling wave energy signals supplied to said second input to said aperture means with an amplitude and phase excitation to cause said aperture means to radiate primarily in the remaining portions of said region, with substantially no radiation at said selected radiation angle; and power divider means, having an input port, for coupling wave energy signals from said input port to the first and second inputs of said illumination means with a first selected phase relation to corresponding said first radiation mode and with a second selected phase relation corresponding to said second radiation mode.

2. An antenna as specified in claim 1 wherein the phase of radiation at said selected angle in said first and second modes differs by 180° and wherein said power divider means comprises means for coupling wave energy signals to the inputs of said illumination means with a first selected phase relation and a second selected phase relation which differs by 180° from said first selected phase relation.

3. An antenna as specified in claim 2 wherein said illumination means comprises means for coupling wave energy signals from said first input to said aperture with a symmetrical amplitude distribution.

4. An antenna as specified in claim 3 wherein said illumination means comprises means for coupling wave energy signals from said second input to said aperture with an asymmetrical amplitude distribution.

5. An antenna system as specified in claim 4 wherein said aperture means comprises an array of antenna elements, and wherein said illumination means includes a plurality of hybrid junctions, the sum ports of said hybrid junctions being coupled to said first input and the difference port of at least one of said hybrid junctions being coupled to said second input.

6. An antenna as specified in claim 1 wherein said aperture means comprises an array of antenna elements and wherein said illumination means includes a beam forming network, the outputs of which are coupled to said elements.

7. An antenna as specified in claim 1 wherein said aperture means comprises a reflecting surface and wherein said illumination means includes a plurality of antenna feed elements.

8. An antenna as specified in claim 1 wherein said aperture means includes an array of antenna elements and wherein said illumination means includes a series coupling network, the outputs of which are coupled to said elements.

9. An antenna as specified in claim 1 wherein said power divider means comprises a power divider and a phase shifter, said phase shifter being capable of alternately providing phase shifts of 0° to 180°.

10. In a Doppler navigation system wherein a ground station uses a reference antenna to radiate a reference frequency signal into an angular region of space and a coding antenna to radiate a frequency coded signal into said region during first and second time intervals, said coded signal having a first frequency offset from said reference signal and a first angular frequency variation during said first time interval and an opposite frequency offset and an opposite angular frequency variation during said second time interval, and wherein a mobile receiver determines its angular location by comparison of the frequency of said reference and coded signals during said first and second time intervals, the improvement wherein said reference antenna has a first radiation mode during said first time interval and a second radiation mode during said second time interval, said second mode having a phase between the radiation in a selected angular direction in said region and the radiation in the remainder of said region which is different than said phase for said first mode.

11. A Doppler navigation system as specified in claim 10 wherein the phase between the radiation in said selected angular direction and the radiation in the remainder of said region comprises opposite quadrature phase in said first and second modes.

12. A Doppler navigation system as specified in claim 11 wherein the phase of radiation at radiation angles having opposite angular displacements from said selected direction is equal.

13. A Doppler navigation system as specified in claim 11 wherein the phase of radiation at radiation angles having opposite angular displacement from said selected direction is opposite.

14. A Doppler navigation system as specified in claim 11 wherein the phase or radiation in said selected direction is different for said first and second modes by 180°.

* * * * *